(12) United States Patent
Souentie et al.

(10) Patent No.: US 10,103,416 B2
(45) Date of Patent: Oct. 16, 2018

(54) SYSTEM AND METHOD FOR POWER GENERATION WITH A CLOSED-LOOP PHOTOCATALYTIC SOLAR DEVICE

(71) Applicant: Saudi Arabian Oil Company, Dhahran (SA)

(72) Inventors: Stamatios Souentie, Dhahran (SA); Ahmad D. Hammad, Dhahran (SA); Konstantinos Kotsovos, Ras Tanura (SA); Zaki Yusuf, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 420 days.

(21) Appl. No.: 15/065,235

(22) Filed: Mar. 9, 2016

(65) Prior Publication Data

US 2017/0263990 A1    Sep. 14, 2017

(51) Int. Cl.
| | |
|---|---|
| *H01L 31/042* | (2014.01) |
| *H01M 16/00* | (2006.01) |
| *H01G 9/20* | (2006.01) |
| *C25B 1/00* | (2006.01) |
| *C25B 1/04* | (2006.01) |
| *H01M 14/00* | (2006.01) |

(52) U.S. Cl.
CPC ........... *H01M 16/003* (2013.01); *C25B 1/003* (2013.01); *C25B 1/04* (2013.01); *H01G 9/20* (2013.01);
(Continued)

(58) Field of Classification Search
CPC .. H01M 16/00; H01M 16/003; H01M 16/006; H01M 14/00; H01M 14/005; C25B 1/003
See application file for complete search history.

(56) References Cited

U.S. PATENT DOCUMENTS

| | | |
|---|---|---|
| 2010/0051095 A1 | 3/2010 | Richter et al. |
| 2012/0080310 A1 | 4/2012 | Nomura et al. |
| 2013/0256147 A1 | 10/2013 | Lewis et al. |
| 2014/0030628 A1 | 1/2014 | McMahon |

FOREIGN PATENT DOCUMENTS

CN    104576068 A    4/2015

OTHER PUBLICATIONS

International Search Report and Written Opinion dated May 17, 2017 pertaining to International application No. PCT/US2017/020851.
(Continued)

*Primary Examiner* — Eli S Mekhlin
(74) *Attorney, Agent, or Firm* — Dinsmore & Shohl, LLP

(57) ABSTRACT

A photocatalytic power generation system including a solar housing, a photoanode, an electrolyte membrane, a cathode, an oxygen diffusion membrane, and an external power generation circuit. The photoanode and the cathode are each positioned within the solar housing and electrically coupled to the external power generation circuit. The electrolyte membrane is positioned between and electrochemically engaged with the photoanode and the cathode forming a photocatalytic cell. The solar housing comprises a closed-loop water chamber having an anode side flow channel, a cathode side flow channel, a recombined water channel, and an oxygen diffusion membrane. Further, the oxygen diffusion membrane is positioned and configured to inhibit recombined water generated at the cathode from flowing from the cathode side to the anode side along the oxygen transport channel and permit recombined water generated at the cathode from flowing from the cathode side to the anode side along the recombined water channel.

25 Claims, 3 Drawing Sheets

(52) U.S. Cl.
CPC ........ *H01M 14/005* (2013.01); *H01G 9/2027* (2013.01); *Y02E 60/366* (2013.01); *Y02E 70/10* (2013.01)

(56) References Cited

OTHER PUBLICATIONS

Minggu et al., "An overview of Photocells and Photoreactors for Photoelectrochemical Water Splitting," International Journal of Hydrogen Energy, Apr. 8, 2010, 5233-5244, 35, Elsevier Ltd.
Walter et al., "Solar Water Splitting Cells", American Chemical Society, 2010, 6446-6473, 110.
Murphy et al., "Efficiency of Solar Water Splitting Using Semiconductor Electrodes", International Journal of Hydrogen Energy, Mar. 13, 2006, 1999-2017, 31, Elsevier Ltd.
Di Paola et al., "A Survey of Photocatalytic Materials for Environmental Remediation", Journal of Hazardous Materials, Nov. 22, 2011, 3-29, 211-212, Elsevier Ltd.
Yadav et al., "Analysis of EIS Technique and Nafion 117 Conductivity as a function of Temperature and Relative Humidity", Journal of Electrochemical Society, Jan. 13, 2012, B340-B346, 159 (3).
Bolton, "Solar Photoproduction of Hydrogen: A Review", Solar Energy, 1996, 37-50, 57, Pergamon Press Ltd.
Bird et al., "Terrestrial Solar Spectral Data Sets", Solar Energy, 1983, 563-573, 30 (6), Pergamon Press Ltd.
King et al., "Bandgap Engineering in High-Efficiency Multijunction Concentrator Cells", International Conference on Solar Concentrators for the Generation of Electricity or Hydrogen, May 1-5, 2005.

SYSTEM AND METHOD FOR POWER GENERATION WITH A CLOSED-LOOP PHOTOCATALYTIC SOLAR DEVICE

BACKGROUND

The present disclosure relates to photocatalytic power generation systems. More specifically, the present disclosure introduces technology for photocatalytic power generation systems that generate power using a radiation activated continuous closed-loop oxidation/reduction cycle.

BRIEF SUMMARY

According to the subject matter of the present disclosure, a photocatalytic power generation system includes a solar housing, a photoanode, an electrolyte membrane, a cathode, an oxygen diffusion membrane, and an external power generation circuit. The solar housing comprises an input window transparent to photoanode activating radiation and comprises an anode side and a cathode side. The photoanode is positioned within the solar housing at the anode side and is electrically coupled to the external power generation circuit. The cathode is positioned within the solar housing at the cathode side and is electrically coupled to the external power generation circuit. The electrolyte membrane is positioned between and electrochemically engaged with the photoanode and the cathode forming a photocatalytic cell. The solar housing comprises a closed-loop water chamber having an anode side flow channel positioned at the anode side and a cathode side flow channel positioned at the cathode side. The solar housing comprises a recombined water channel extending from the anode side flow channel to the cathode side flow channel and comprises an oxygen transport channel extending from the anode side flow channel to the cathode side flow channel. Further, the oxygen diffusion membrane is positioned between the anode side flow channel and the oxygen transport channel and is structurally configured to inhibit recombined water generated at the cathode from flowing from the cathode side flow channel to the anode side flow channel along the oxygen transport channel and permit recombined water generated at the cathode from flowing from the cathode side flow channel to the anode side flow channel along the recombined water channel.

In accordance with one embodiment of the present disclosure, a photocatalytic power generation system includes a solar housing, a photoanode, an electrolyte membrane, a cathode, an oxygen diffusion membrane, and an external power generation circuit. The solar housing comprises an input window transparent to photoanode activating radiation. The photoanode is positioned within the solar housing and is electrically coupled to the external power generation circuit. The cathode is positioned within the solar housing and is electrically coupled to the external power generation circuit. The solar housing comprises a closed-loop water chamber that encircles the photoanode, the cathode, and the electrolyte membrane. The oxygen diffusion membrane is positioned in the closed-loop water chamber and is structurally configured to inhibit water flow through the oxygen diffusion membrane and permit oxygen molecule flow through the oxygen diffusion membrane. The photoanode is structurally configured to receive photoanode activating radiation and, upon exposure to photoanode activating radiation, output an electron receivable by the external power generation circuit and generate an electron hole such that water housed within the closed-loop water chamber oxidizes into a hydrogen ion and an oxygen molecule at the electron hole. The electrolyte membrane is structurally configured to provide a proton pathway between the photoanode and the cathode. The closed-loop water chamber is structurally configured to provide a pathway for oxygen molecules that traverses the oxygen diffusion membrane and extends between the photoanode and the cathode. The cathode is structurally configured to receive the hydrogen ion from the proton pathway, receive the oxygen molecule, and combine the hydrogen ion and the oxygen molecule into recombined water via reduction of the hydrogen ion and the oxygen molecule. Further, the closed-loop water chamber is structurally configured to provide a pathway for recombined water that does not traverse the oxygen diffusion membrane and extends between the cathode and the photoanode.

Although the concepts of the present disclosure are described herein with primary reference to some specific photocatalytic power generation system configurations, it is contemplated that the concepts will enjoy applicability to photocatalytic power generation systems having any number of photoanodes, electrolyte membranes, and cathodes.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
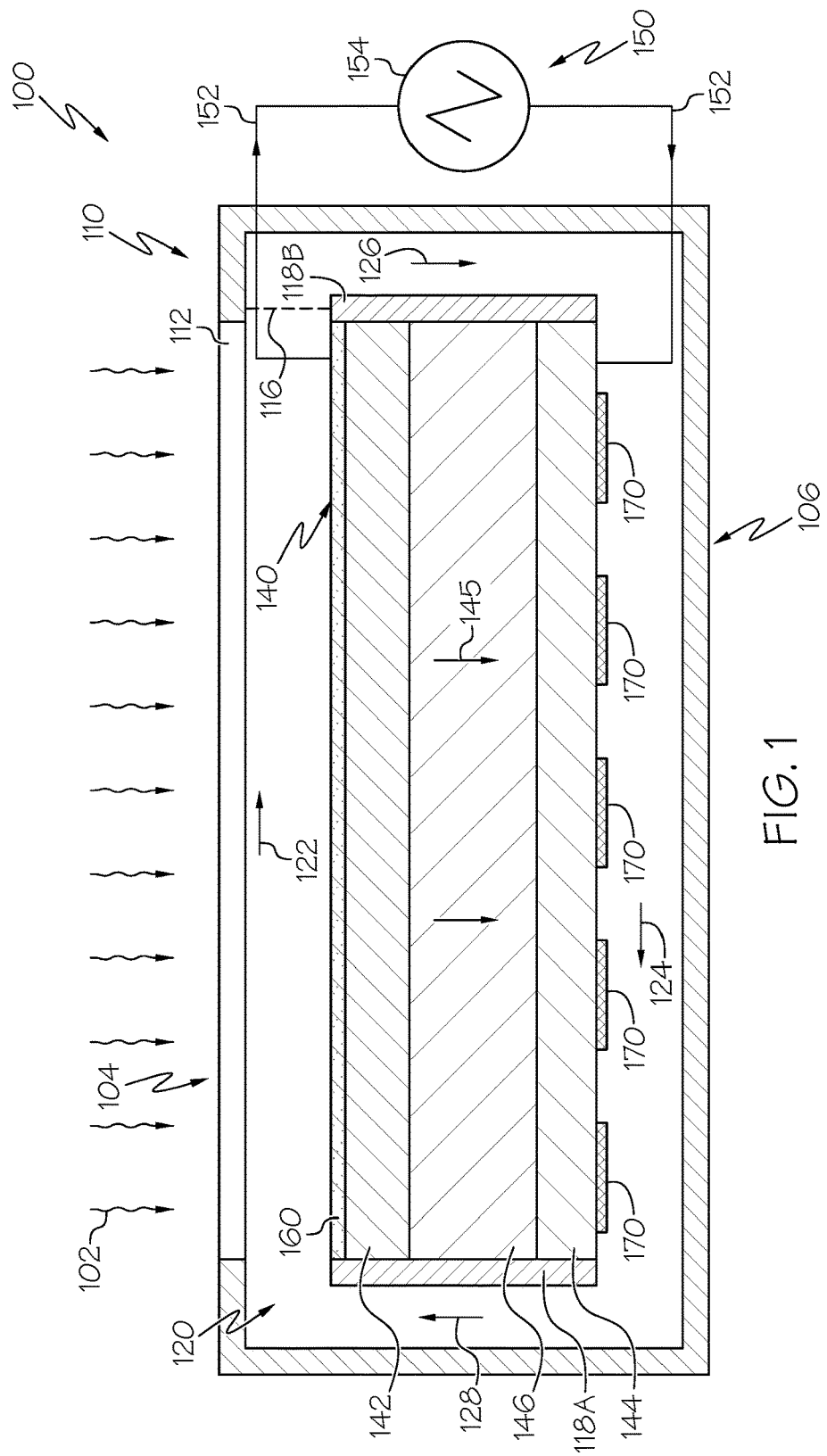
FIG. 1 is a schematic illustration of a photocatalytic power generation system according to one or more embodiments shown and described herein.

FIG. 1 is a schematic illustration of a photocatalytic power generation system 100 comprising a solar housing 110, a photoanode 142, an electrolyte membrane 146, a cathode 144, an oxygen diffusion membrane 116, and an external power generation circuit 150. The solar housing 110 comprises an input window 112 that is transparent to photoanode activating radiation 102, for example, solar radiation such as ultraviolet radiation, visible radiation, infrared radiation, or the like.

In some embodiments, the solar housing 110 can be described as comprising an anode side 104 and a cathode side 106. The input window 112 may be positioned at the anode side 104 of the solar housing 110. The photoanode 142 may be similarly positioned within the solar housing 110 at the anode side 104 and is electrically coupled to the external power generation circuit 150. The cathode 144 can be positioned within the solar housing 110 at the cathode side 106 and is also electrically coupled to the external power generation circuit 150. Further, the electrolyte membrane 146 is positioned between, and is electrochemically engaged with, the photoanode 142 and the cathode 144, forming a photocatalytic cell 140. The solar housing 110 can be constructed of a variety of materials suitable for containing electrochemically active components of the type illustrated herein, including any material that can provide hermetical separation between the electrochemically active components and ambient air, humidity, dust, or the like, and any material that can provide structural and mechanical integrity to the solar housing 110. For example, it is contemplated that the solar housing 110 may be constructed of one or more metals, INOX metals, plastic, plexiglass, fiberglass, or combinations thereof.

The external power generation circuit 150 comprises a power generation unit 154 and a circuit pathway 152. The circuit pathway 152 comprises an electrical pathway, for example, conductive wires, conductive traces, or the like, and is electrically coupled to the photoanode 142, the power generation unit 154, and the cathode 144. The power generation unit 154 is structurally configured to receive current generated by electrons output by the photoanode 142. Upon receiving current, the power generation unit 154 is structurally configured to generate power.

As depicted in FIG. 1, the solar housing 110 comprises a closed-loop water chamber 120 that encircles the photocatalytic cell 140 and, in some embodiments, is hermetically sealed within the solar housing 110. Water may be housed within the closed-loop water chamber 120 of the solar housing 110, for example, liquid water, gaseous water, or a combination thereof. In some embodiments, a mixture of water and inert gases may be housed within the closed-loop water chamber 120. The inert gases include inert gases that do not absorb photoanode activating radiation 102, for example, $N_2$, He, Ar, or the like. In operation, the water housed within the closed-loop water chamber 120 is oxidized and reduced in a continuous closed-loop oxidation/reduction cycle in which water is split at the photoanode 142, recombined at the cathode 144, and transported back to the photoanode 142 for reuse. It is contemplated that the pressure within the solar housing 110 may approximate atmospheric pressure.

The closed-loop water chamber 120 includes an anode side flow channel 122 positioned at the anode side 104 and a cathode side flow channel 124 positioned at the cathode side 106. The closed-loop water chamber 120 also comprises a recombined water channel 128 extending from the anode side flow channel 122 to the cathode side flow channel 124 and an oxygen transport channel 126 extending from the anode side flow channel 122 to the cathode side flow channel 124. Both the recombined water channel 128 and the oxygen transport channel 126 fluidly couple the anode side flow channel 122 and the cathode side flow channel 124. In addition, water positioned in the anode side flow channel 122 may contact the photoanode 142 and water positioned in the cathode side flow channel 124 may contact the cathode 144.

The oxygen diffusion membrane 116 is positioned in the closed-loop water chamber 120, for example, between the anode side flow channel 122 and the oxygen transport channel 126. The oxygen diffusion membrane 116 provides a selective barrier within the closed-loop water chamber 120, permitting oxygen diffusion through the oxygen diffusion membrane 116 and inhibiting water diffusion through the oxygen diffusion membrane 116. By providing a selective barrier, the oxygen diffusion membrane 116 passively controls the flow of water in the closed-loop water chamber 120 to facilitate the continuous closed-loop oxidation/reduction cycle. In particular, the oxygen diffusion membrane 116 is structurally configured to inhibit recombined water generated at the cathode 144 from flowing from the cathode side flow channel 124 to the anode side flow channel 122 along the oxygen transport channel 126 and permit recombined water generated at the cathode 144 from flowing from the cathode side flow channel 124 to the anode side flow channel 122 along the recombined water channel 128.

It is contemplated that the oxygen diffusion membrane 116 may be constructed of any membrane material suitable for selectively permitting oxygen diffusion in an aqueous solution or a gaseous solution comprising water vapor. Beyond this, the precise composition of the oxygen diffusion membrane 116 is beyond the scope of the present disclosure and may be learned from conventional and yet-to-be developed teachings on the subject. For example, it is contemplated that the oxygen diffusion membrane 116 may be formed from porous inorganic membranes, porous polymer membranes, organic-inorganic composite membranes, silicon rubber, or combinations thereof. Example porous inorganic membranes include glass, metal, alumina, zirconia, zeolites, carbon fibers, cordierite, silicon carbide, silicon nitride, titania, tin oxide, mica or combinations thereof. Example porous polymer membranes include membranes having perfluorodioxole, polyethersulfone, polyaniline, polyimide, polysulfone, polyaramide, polycarbonate, silicone rubber, polyphenylene oxide, cellulose acetate, polypropylene, or combinations thereof. Moreover, the oxygen diffusion membrane 116 may comprise any membrane geometry, for example, hollow fiber membranes, spiral-wound membranes, plate-and-frame membranes, or the like.

In some embodiments, a first cell wall 118a and a second cell wall 118b are each positioned in the solar housing 110 and are each coupled to the photocatalytic cell 140. The first cell wall 118a is positioned between the photocatalytic cell 140 and the recombined water channel 128 and may be coupled to each of the photoanode 142, the electrolyte membrane 146, and the cathode 144. The first cell wall 118a provides a barrier between the recombined water channel 128 and each of the photoanode 142, the electrolyte membrane 146, and the cathode 144. The second cell wall 118b is positioned between the photocatalytic cell 140 and the oxygen transport channel 126 and may be coupled to each of the photoanode 142, the electrolyte membrane 146, and the cathode 144. The second cell wall 118b provides a barrier between the oxygen transport channel 126 and each of the photoanode 142, the electrolyte membrane 146, and the cathode 144. In some embodiments, the first and second cell walls 118a, 118b are each coupled to the solar housing 110, affixing the photocatalytic cell 140 within the solar housing 110 such that the closed-loop water chamber 120 encircles the photocatalytic cell 140. Further, in some embodiments, the oxygen diffusion membrane 116 is positioned between and coupled to the second cell wall 118b and the solar housing 110. It is contemplated that the cell walls 118a, 118b may be constructed of any material suitable for maintaining the structural and electrochemical integrity of the photocatalytic cell 140. For example, and not by way of limitation, it is contemplated that the first and second cell walls 118a, 118b may be constructed of any corrosion tolerant electrical insulating material, for example, polymers, such as polypropylene or Nation®, ceramics, such as alumina or titania, or combinations thereof.

Referring still to FIG. 1, the photoanode 142 is a photosensitive anode comprising one or more semiconductor materials (for example, p-type semiconductor materials) and is structurally configured to absorb solar radiation within a wavelength range of photoanode activating radiation 102, such as ultraviolet radiation, visible radiation, infrared radiation, or a combination thereof. The photoanode 142 comprises a bandgap energy ($E_{bg}$), which is the energy difference between the valance band of the photoanode 142 and the conduction band of the photoanode 142. The photon energy of the photon activating radiation 102 in which the photoanode 142 is configured to absorb is substantially equal to or greater than the bandgap energy of the photoanode 142. Further, the photon energy and photon wavelength of the photoanode activating radiation 102 are inversely related, for example, $E=hc/\lambda$, where E is the photon energy, h is the Planck's constant ($6.626\times10^{-34}$ joule seconds), c is the speed of light ($2.998\times10^8$ meters/second), and $\lambda$ is the photon wavelength. As one example, the photoanode 142 comprising a bandgap energy of about 2 electron volts (eV) is configured to absorb photon activating radiation 102 comprising a photon energy greater than or equal to about 2 eV and a photon wavelength less than or equal to about 620 nanometers (nm). Further, photoanode activating radiation 102 comprising a photon energy that is greater than the bandgap energy of the photoanode 142 is absorbed by the photoanode 142 but may be thermalized and transformed into heat.

In some embodiments, the photoanode 142 may comprise a bandgap energy of between about 3.10 eV and about 3.94 eV such that the photoanode 142 is configured to absorb photoanode activating radiation 102 comprising a wavelength up to about 400 nm, for example, ultraviolet radiation between about 315 nm and about 400 nm. The photoanode 142 may comprise a bandgap energy between about 1.77 eV and about 3.10 eV such that the photoanode 142 is configured to absorb photoanode activating radiation 102 comprising a wavelength up to about 700 nm, for example, visible radiation between about 400 nm and about 700 nm. Further, the photoanode 142 may comprise a bandgap energy of between about 0.41 eV and about 1.77 eV such that the photoanode 142 is configured to absorb photoanode activating radiation 102 comprising a wavelength up to about 3000 nm, for example, infrared radiation between about 700 nm and about 3000 nm. In some embodiments, the photoanode 142 may be configured to absorb photoanode activating radiation 102 comprising a large photon energy density, which is a product of photon flux and photon energy. The maximum photon energy density of the solar spectrum is within a wavelength range of about 440 nm and about 660 nm, corresponding to a bandgap energy between about 1.8 eV and about 2.8 eV.

Further, the one or more semiconductor materials of the photoanode 142 are selected from one or more of a binary oxide, a binary sulfide, a doped oxide, a ternary oxide, a quaternary oxide, an Ag-based oxide, an indium hydroxide, a bismuth oxyhalide, or a quaternary oxyhalide. Example binary oxides include ZnO ($E_{bg}$=3.0 eV), WO$_3$ ($E_{bg}$=2.8 eV), Bi$_2$O$_3$ ($E_{bg}$=2.8 eV), TiO$_2$ ($E_{bg}$=3.2 eV), CeO$_2$ ($E_{bg}$=2.9 eV), Fe$_2$O$_3$ ($E_{bg}$=2.2 eV), or the like. Example doped TiO$_2$ materials include N—TiO$_2$ ($E_{bg}$=2.73 eV), Pt—TiO$_2$ ($E_{bg}$=2.7 eV), S—TiO$_2$ ($E_{bg}$=2.3 eV), Ce—TiO$_2$ ($E_{bg}$=2.3 eV), Fe—TiO$_2$ ($E_{bg}$=2.5 eV), or the like. Example binary sulfides include CdS ($E_{bg}$=2.4 eV), CdSe ($E_{bg}$=1.7 eV), Sb$_2$S$_5$ ($E_{bg}$=1.6 eV), or the like. Example ternary compounds include InVO$_4$ ($E_{bg}$ between about 1.8 eV and about 2.0 eV), Bi$_2$WO$_6$ ($E_{bg}$ between about 1.8 eV and about 2.0 eV), Zn$_2$SnO$_4$($E_{bg}$=3.6 eV), ZnIn$_2$S$_4$ ($E_{bg}$=2.2 eV), BaBiO$_3$ ($E_{bg}$=2.1 eV), NaBiO$_3$($E_{bg}$=2.6 eV), SrTiO$_3$ ($E_{bg}$=3.2 eV), BiFeO$_3$($E_{bg}$ between about 2.1 eV and about 2.5 eV), Pb$_3$Nb$_4$O$_{13}$ ($E_{bg}$=3 eV), Pb$_3$Nb$_2$O$_8$($E_{bg}$=2.8 eV), Ca$_2$Sb$_2$O$_7$ ($E_{bg}$=4.0 eV), Sr$_2$Sb$_2$O$_7$($E_{bg}$=3.9 eV), or the like. Example Ag based oxides include AgAlO$_2$($E_{bg}$=3.0 eV), AgCrO$_2$ ($E_{bg}$=1.7 eV), Ag$_2$CrO$_4$($E_{bg}$=1.8 eV), Ag$_2$GeO$_3$($E_{bg}$=1.8 eV), or the like. Example bismuth oxyhalides includes BiOI ($E_{bg}$=1.8 eV), BiOBr ($E_{bg}$=2.9 eV), BiOCl ($E_{bg}$=3.2 eV), or the like. Further, it should be understood that photoanodes 142 comprising any semiconductor material are contemplated.

In operation, upon exposure to photoanode activating radiation 102, the photoanode 142 absorbs a wavelength range of the photoanode activating radiation 102 comprising photons with a photon energy substantially equal to or greater than the bandgap energy of the photoanode 142. When the photoanode activating radiation 102 is absorbed, an electron of the photoanode 142 is excited from a valence band to a conduction band such that an electron hole is generated in the valence band and an electron is output by the photoanode 142. The electron output by the photoanode 142 is receivable by the external power generation circuit 150, generating current in the circuit pathway 152 such that power is generated in the power generation unit 154. The electron hole operates as an active site for the photocatalytic oxidation of water housed within the anode side flow channel 122 into a hydrogen ion (H$^+$) and an oxygen molecule (O$_2$), represented by the chemical equation: $H_2O \rightarrow 2H^+ + {}^{1/2}O_2 + 2e^-$. In some embodiments, the oxygen molecule comprises gaseous oxygen.

Referring still to FIG. 1, the electrolyte membrane 146 comprises a solid state proton conducting electrolyte. For example, the electrolyte membrane 146 may comprise Nation®, Nation® 117, polybenzimidazole, a polyether polymer, such as a pyridine based polyether polymer, or a solid acid, such as CsHSO$_4$, CsHSeO$_4$, Rb$_3$H(SeO$_4$)$_2$, (NH$_4$)$_3$H(SO$_4$)$_2$, K$_3$H(SO$_4$)$_2$, or the like. The electrolyte membrane 146 is structurally configured to provide a proton pathway 145 between the photoanode 142 and the cathode 144. In operation, when water housed within the anode side flow channel 122 is photocatalytically oxidized into an oxygen molecule and a hydrogen ion, the oxygen molecule may diffuse through the oxygen diffusion membrane 116 and traverse the oxygen transport channel 126 and the hydrogen ion may traverse the electrolyte membrane 146 along the proton pathway 145, from the photoanode 142 to the cathode 144. In some embodiments, the electrolyte membrane 146 may operate (for example, provide the proton pathway 145) at a temperature between about 25° C. and about 150° C. however, it should be understood that any operating temperature is contemplated.

The cathode 144 comprises a noble metal, a transition metal, or a combination thereof. In some embodiments, the cathode 144 comprises one or more porous, electronically conductive single or mixed metal oxides, for example, oxides of In, Sn, Zn, or the like. The cathode 144 is structurally configured to receive a hydrogen ion from the proton pathway 145 provided by the electrolyte membrane 146, receive an oxygen molecule from the oxygen transport channel 126, receive an electron from the external power generation circuit 150, and electrochemically combine the hydrogen ion, the oxygen molecule, and the electron into recombined water via reduction of the hydrogen ion and the oxygen molecule. The recombined water enters the cathode side flow channel 124 and is transported from the cathode side flow channel 124 to the anode side flow channel 122 along the recombined water channel 128 for reuse in the continuous closed-loop oxidation/reduction cycle. In some embodiments, the cathode 144 may operate at a temperature between about 25° C. and about 150° C., however, it should be understood that any operating temperature is contemplated. Further, because the cathode 144 does not comprise a semiconductor material, electron-hole internal recombination does not occur in the photocatalytic cell 140, reducing the degradation of the photocatalytic cell 140 and increasing the efficiency and the operation lifetime of the photocatalytic cell 140.

In some embodiments, a maximum operating potential of the photocatalytic cell 140 may be increased when the bandgap energy of the photoanode 142 is increased. The maximum operating potential under open circuit conditions is the difference between the cathodic reaction potential of the cathode 144 and the anodic reaction potential of the photoanode 142. For example, $OCP=P_C-P_{PA}$ where OCP is the maximum operating potential of the photocatalytic cell 140, $P_C$ is the cathodic reaction potential of the cathode 144 and $P_{PA}$ is the anodic reaction potential of the photoanode 142. In some embodiments, $P_C$ is about 1.23 volts (V), and $P_{PA}=621$ ($E_{bg}$/q−1.23 V) where $E_{bg}$ is the bandgap energy of the photoanode 142, and q is the elementary charge. Accordingly, $OCP=P_C-P_{PA}$ can be rewritten as $OCP=E_{bg}/q$, which shows the positive linear relationship between the maximum operating potential of the photocatalytic cell 140 and the bandgap energy of the photoanode 142.

In some embodiments, the solar cell efficiency of the photocatalytic cell 140 may be increased by increasing the temperature of the photocatalytic cell 140. The solar cell efficiency of the photocatalytic cell 140 is $\varepsilon=\varepsilon_s\varepsilon_q\varepsilon_{chem}$ where $\varepsilon_s$ is a solar irradiance efficiency of the photocatalytic cell 140, $\varepsilon_q$ is a quantum efficiency of the photocatalytic cell 140, and $\varepsilon_{chem}$ is a chemical efficiency of the oxidation/reduction cycle of the photocatalytic cell 140. The solar irradiance efficiency $\varepsilon_s$ is the percentage of photons received by the photoanode 142 that comprise a photon energy greater than the bandgap energy of the photoanode 142. The quantum efficiency $\varepsilon_q$ is the percentage of photons received by the photoanode 142 that are converted into electrical current.

Further, the chemical efficiency of the oxidation/reduction cycle $\varepsilon_{chem}$ is a ratio of the water splitting energy to the energy of generated electron holes, for example, $\varepsilon_{chem}=(E_{bg}-E_{loss})/E_{bg}$ where $E_{loss}=E_{loss,entropy}+E_{loss,kinetic}$, $E_{loss,entropy}$ is the entropic loss of the photocatalytic cell 140, and $E_{loss,kinetic}$ is the kinetic loss of the photocatalytic cell 140. Further, $E_{loss,entropy}=T\Delta S_{exc}$ where T is the temperature of the photocatalytic cell 140 and $\Delta S_{exc}$ is the entropy increase caused by the creation of excited states in a matrix of ground states in the photoanode 142 when the photoanode 142 receives photoanode activating radiation 102. Further, $E_{loss,kinetic}=\eta_{an}+\eta_{cath}+IR_{el}$ where $\eta_{an}$ is the overpotential of the photoanode 142, $\eta_{cath}$ is the overpotential of the cathode 144, and $IR_{el}$ is the ohmic drop of the electrolyte membrane 146.

In operation, temperature has a positive linear relationship with the $E_{loss,entropy}$ of the photocatalytic cell 140 such that a temperature increase causes a linear increase of $E_{loss,entropy}$. Further, temperature has a negative exponential relationship with the $E_{loss,kinetic}$ of the photocatalytic cell 140 such that a temperature increase causes an exponential decrease of $E_{loss,kinetic}$. Accordingly, an increase in temperature decreases the $E_{loss}$ of the photocatalytic cell 140 due to the exponential decrease of $E_{loss,kinetic}$ such that an increase in temperature increases the solar cell efficiency $\varepsilon$ of the photocatalytic cell 140. In one example embodiment in which the electrolyte membrane 146 comprises Nafion® 117, a temperature increase from about 25° C. to about 80° C. causes a kinetic loss ($E_{loss,kinetic}$) decrease of about 75% and an entropic loss ($E_{loss,entropy}$) increase of about 20%, such that the overall loss of the photocatalytic cell 140 ($E_{loss}$) is decreased by about 55%. Further, in embodiments in which all photons absorbed by the photoanode 142 are converted into current, (for example, where $\varepsilon_q=1$), the chemical efficiency $\varepsilon_{chem}$ of the photocatalytic cell 140 is $$\varepsilon_{chem} = \frac{\Delta G_R}{n} \bigg/ E_{bg}$$

where $\Delta G_R$ is the reaction Gibbs free energy and n is the number of photons per oxidation/reduction reaction step. Increased temperature increases $\Delta G_R$ such that the oxidation/reduction reaction occurs more easily at greater temperatures and allows the use of photoanodes 142 having lesser $E_{bg}$ at greater temperatures.

Referring again to FIG. 1, the photocatalytic power generation system 100 may further comprise a solar irradiation heat trap 170 positioned within the solar housing 110. In some embodiments, the solar irradiation heat trap 170 is thermally coupled to the photocatalytic cell 140, for example, thermally coupled to the cathode 144. The solar irradiation heat trap 170 may comprise a plurality of porous strips affixed to the cathode 144, for example, in an intermittent arrangement such that portions of the cathode 144 contact the solar irradiation heat trap 170 and portions of the cathode 144 are directly exposed to the cathode side flow channel 124. The solar irradiation heat trap 170 is structurally configured to absorb solar radiation and, upon absorption of solar radiation, increase in temperature, increasing both the chemical efficiency of the oxidation/reduction process and the overall solar cell efficiency of the photocatalytic cell 140. The solar irradiation heat trap 170 is preferably constructed of a material that can endure prolonged operation in an aqueous environment, readily absorbs solar radiation, and has relatively high specific heat capacity and thermal conductivity. For example, and not by way of limitation, it is contemplated that the solar irradiation heat trap 170 may be constructed of cupric oxide, black chrome nickel plated copper, black nickel, titanium nitride oxide, or combinations thereof.

In operation, the solar irradiation heat trap 170 and the photoanode 142 may be structurally configured to absorb solar radiation comprising at least partially exclusive wavelength ranges, allowing both the photoanode 142 and the solar irradiation heat trap 170 to simultaneously absorb solar radiation. For example, the photoanode 142 may be structurally configured to absorb solar radiation within a first wavelength range and the solar irradiation heat trap 170 may be structurally configured to absorb solar radiation within a second wavelength range that is at least partially exclusive of the first wavelength range. Further, the first wavelength range may comprise wavelengths that are greater than wavelengths within the second wavelength range such that the photoanode 142 absorbs solar radiation within the second wavelength range and is transparent to solar radiation within the first wavelength range. This allows the first wavelength range of solar radiation to traverse the photoanode 142 and reach the solar irradiation heat trap 170.

In one example embodiment, the solar irradiation heat trap 170 comprises an infrared heating layer structurally configured to absorb solar radiation comprising an infrared wavelength range of solar radiation (for example, between about 700 nm and about 3000 nm) and increase in temperature, increasing the solar cell efficiency of the photocatalytic cell 140. In this example, the photoanode 142 may be configured to absorb visible radiation, ultraviolet radiation, or both while allowing infrared radiation to traverse the photoanode 142 and reach the solar irradiation heat trap 170.

Referring still to FIG. 1, the photocatalytic cell 140 may comprise a doping layer 160 positioned on or in the photoanode 142. In some embodiments, the doping layer 160 comprises a photon upconversion doping material, the particular composition and configuration of which may be learned from conventional or yet-to-be developed teachings related to photon upconversion in photovoltaic devices. For example, and not by way of limitation, it is contemplated that the photon upconversion doping material may comprise $Er^{3+}$ doped $NaYF_4$, $Yb^{3+}$ and $Er^{3+}$ doped $NaYF_4$, $Yb^{3+}$ and $Er^{3+}$ doped $La_2O_2S$, Texaphyrin (TXP)-sensitized rubrene, perylene-fused BODIPY, or a combination thereof. The photoanode 142, doped with the photon upconversion doping material, is structurally configured to receive photoanode activating radiation 102 comprising a first photon having a first photon energy and a second photon having a second photon energy and is structurally configured to combine the energy of the first photon and the energy of the second photon to obtain excitation of a single electron. The combined photon energy may be greater than or equal to the bandgap energy of the photoanode 142, such that the photoanode 142 absorbs the combined photon and outputs an electron receivable by the 150, as described previously. By combining photons having photon energies less than the bandgap energy of the photoanode 142 into combined photons having photon energies greater than or equal to the bandgap energy of the photoanode 142, the photoanode 142 may absorb a greater portion of the solar spectrum and thus increase the efficiency of the photocatalytic cell 140.

In some embodiments, the doping layer 160 comprises a photon downconversion doping material, the particular composition and configuration of which may be learned from conventional or yet-to-be developed teachings related to photon downconversion in photovoltaic devices. For example, and not by way of limitation, it is contemplated that the photon downconversion doping material may comprise $Dy^{3+}$ doped $LaVO_4$, $Dy^{3+}$ doped $GdVO_4$, $Eu^{3+}$ doped $LiGDF_4$, or a combination thereof. The photoanode 142, doped with the photon downconversion doping material, is structurally configured to receive photoanode activating radiation 102 comprising a first photon and, upon exposure to the first photon, output two electrons receivable by the external power generation circuit 150 and generate two electron holes such that water housed within the closed-loop water chamber 120 oxidizes into a hydrogen ion and an oxygen molecule at each electron hole.

Figure 2:
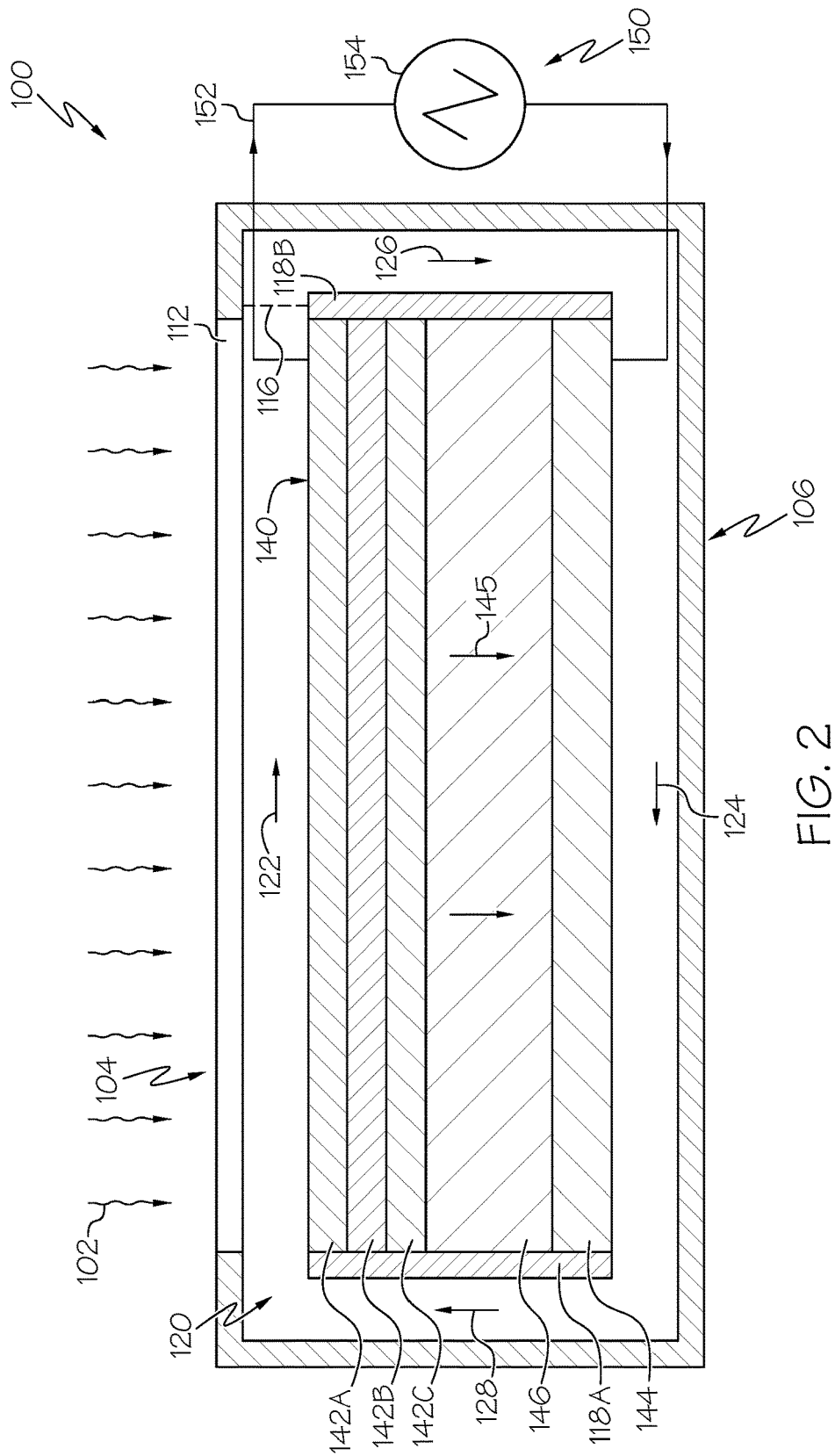
FIG. 2 is a schematic illustration of a photocatalytic power generation system having a plurality of photoanodes according to one or more embodiments shown and described herein.

Referring now to FIG. 2, the photocatalytic cell 140 may comprise a plurality of photoanodes 142, for example, a first photoanode 142a, a second photoanode 142b, and a third photoanode 142c. As depicted in FIG. 2, the plurality of photoanodes 142 may be positioned in a stacked arrangement. For example, the second photoanode 142b is electrochemically engaged with the first photoanode 142a and positioned between the first photoanode 142a and the electrolyte membrane 146. Further, the third photoanode 142c is electrochemically engaged with the second photoanode 142b and positioned between the second photoanode 142b and the electrolyte membrane 146. Further, the circuit pathway 152 of the external power generation circuit 150 is electrically coupled to the first, second, and third photoanodes 142a, 142b, 142c, such that electrons generated by each photoanode 142a, 142b, 142c are receivable by the power generation unit 154.

Figure 3:
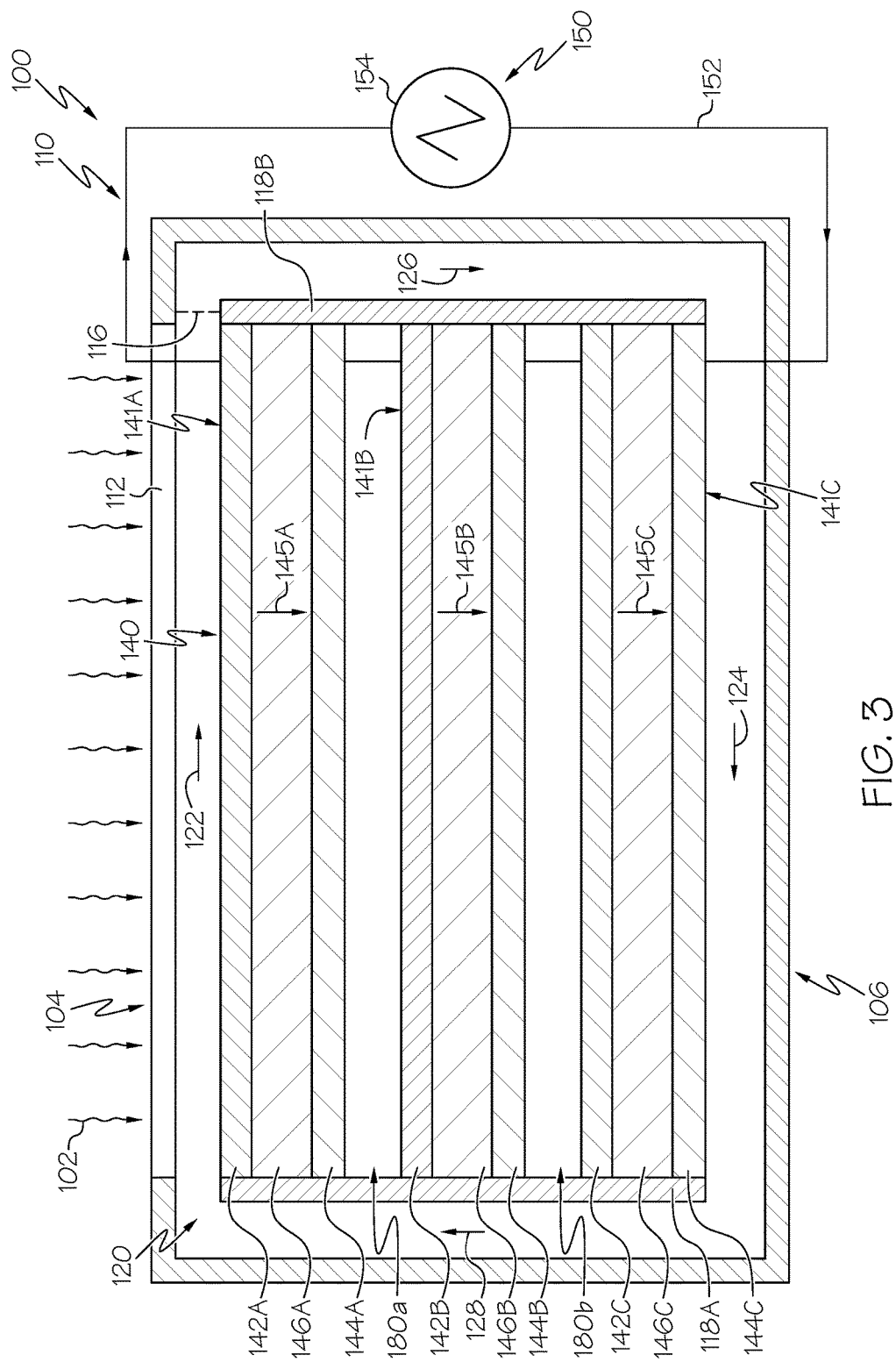
FIG. 3 is a schematic illustration of a photocatalytic power generation system having a plurality of photocatalytic sub-cells according to one or more embodiments shown and described herein.

Referring now to FIG. 3, the photocatalytic cell 140 may comprise a plurality of photocatalytic sub-cells 141 each spaced apart to form water sub-chambers 180 therebetween. For example, the photocatalytic cell 140 may comprise a first photocatalytic sub-cell 141a including the first photoanode 142a, a first electrolyte membrane 146a and a first cathode 144a, a second photocatalytic sub-cell 141b including the second photoanode 142b, a second electrolyte membrane 146b, and a second cathode 144b, and a third photocatalytic sub-cell 141c including the third photoanode 142c, a third electrolyte membrane 146c, and a third cathode 144c. It should be understood that any number of photocatalytic sub-cells 141 are contemplated.

As depicted in FIG. 3, the second photocatalytic sub-cell 141b is positioned between the first photocatalytic sub-cell 141a and the cathode side flow channel 124 and is spaced apart from the first photocatalytic sub-cell 141a to form a first water sub-chamber 180a therebetween. The third photocatalytic sub-cell 141c is positioned between the second photocatalytic sub-cell 141b and the cathode side flow channel 124 and spaced apart from the second photocatalytic sub-cell 141b to form a second water sub-chamber 180b therebetween. In addition, the first cell wall 118a and the second cell wall 118b are coupled to each photocatalytic sub-cell 141. The first cell wall 118a is positioned between the photocatalytic sub-cells 141 and the recombined water channel 128 and the second cell wall 118b is positioned between the photocatalytic sub-cells 141 and the oxygen transport channel 126. Each water sub-chamber 180a, 180b houses water and is enclosed between the first cell wall 118a, the second cell wall 118b, and adjacent photocatalytic sub-cells 141. Further, the circuit pathway 152 of the external power generation circuit 150 is electrically coupled to the photoanode 142 of each photocatalytic sub-cell 141.

Referring collectively to FIGS. 2 and 3, the first photoanode 142a comprises a first bandgap energy and is structurally configured to absorb photoanode activating radiation 102 within a first wavelength range. The photoanode activating radiation 102 within the first wavelength range comprises a photon energy that is substantially equal to or greater than the first bandgap energy. The second photoanode 142b comprises a second bandgap energy and is structurally configured to absorb photoanode activating radiation 102 within a second wavelength range. The photoanode activating radiation 102 within the second wavelength range comprises a photon energy substantially equal to or greater than the second bandgap energy. The third photoanode 142c comprises a third bandgap energy and is structurally configured to absorb photoanode activating radiation 102 within a third wavelength range. The photoanode activating radiation 102 within the third wavelength range comprises a photon energy substantially equal to the third bandgap energy.

The bandgap energies of the first, second, and third photoanodes 142a, 142b, 142c, are each at least partially exclusive of the bandgap energies of the remaining ones of the first, second, and third photoanodes 142a, 142b, 142c such that each of the first, second, and third wavelength ranges are at least partially exclusive. The photocatalytic cell 140 comprising multiple photoanodes 142 each having at least partially exclusive bandgap energies may absorb photon activating radiation 102 within a larger wavelength range of the solar spectrum than the photocatalytic cell 140 comprising an individual photoanode 142 and may minimize photon energy lost to thermalization. Additionally, the first, second, and third photoanodes 142a, 142b, 142c may be arranged such that photoanodes 142 positioned nearer the input window 112 (for example, the first photoanode 142a) comprise lesser bandgap energies than photoanodes 142 positioned farther from the input window 112 (for example, the second photoanode 142b) such that intervening photoanodes 142 (those positioned nearer the input window 112) are transparent to wavelength ranges of the photoanode activating radiation 102 that subsequent photoanodes 142 (those positioned farther from the input window 112) are structurally configured to absorb. Further, it should be understood that while three photoanodes 142a, 142b, 142c are depicted in FIGS. 2 and 3, any number of photoanodes 142 are contemplated in both embodiments.

Referring again to FIG. 3, the first electrolyte membrane 146a and the first cathode 144a of the first photocatalytic sub-cell 141a are each transparent to photoanode activating radiation 102 at least within the first and second wavelength ranges. Further, the second electrolyte membrane 146b and the second cathode 144b of the second photocatalytic sub-cell 141b are each transparent to photoanode activating radiation 102 within the second wavelength range. Example photoanode activating radiation transparent electrolyte membranes 146 include Nation® 117 and polyether polymer. Example photoanode activating radiation transparent cathodes 144 include porous, electronically conductive single or mixed metal oxides, for example, oxides of In, Sn, Zn, or the like.

Referring still to FIG. 3, upon exposure to photoanode activating radiation 102 within the first wavelength range, the first photoanode 142 outputs a first electron receivable by the external power generation circuit 150 and generates a first electron hole such that water housed within the anode side flow channel 122 oxidizes into a hydrogen ion and an oxygen molecule at the first electron hole. Upon exposure to photoanode activating radiation 102 within the second wavelength range, the second photoanode 142b outputs a second electron receivable by the external power generation circuit 150 and generates a second electron hole such that water housed within the first water sub-chamber 180a oxidizes into a hydrogen ion and an oxygen molecule at the second electron hole. Further, upon exposure to photoanode activating radiation 102 within the third wavelength range, the third photoanode 142c outputs a third electron receivable by the external power generation circuit 150 and generates a third electron hole such that water housed within the second water sub-chamber 180b oxidizes into a hydrogen ion and an oxygen molecule at the third electron hole.

Referring still to FIG. 3, the first electrolyte membrane 146a is structurally configured to provide a first proton pathway 145a between the first photoanode 142a and the first cathode 144a, the second electrolyte membrane 146b is structurally configured to provide a second proton pathway 145b between the second photoanode 142b and the second cathode 144b, and the third electrolyte membrane 146c is structurally configured to provide a third proton pathway 145c between the third photoanode 142c and the third cathode 144c.

Further, the first cathode 144a is structurally configured to receive the hydrogen ion from the first proton pathway 145a, receive the oxygen molecule generated in the first water sub-chamber 180a by the second photoanode 142b, receive an electron from the external power generation circuit 150, and electrochemically combine the hydrogen ion, the oxygen molecule, and the electron into recombined water via reduction of the hydrogen ion and the oxygen molecule. The second cathode 144b is structurally configured to receive the hydrogen ion from the second proton pathway 145b, receive the oxygen molecule generated in the second water sub-chamber 180b by the third photoanode 142c, receive an electron from the external power generation circuit 150, and electrochemically combine the hydrogen ion, the oxygen molecule, and the electron into recombined water via reduction of the hydrogen ion and the oxygen molecule. The recombined water remains in both the first and second water sub-chambers 180a, 180b for reuse in the continuous closed-loop oxidation/reduction cycle.

Additionally, the third cathode 144c is structurally configured to receive the hydrogen ion from the third proton pathway 145c, receive the oxygen molecule generated by the first photoanode 142a from the oxygen transport channel 126, receive an electron from the external power generation circuit 150, and electrochemically combine the hydrogen ion, the oxygen molecule, and the electron into recombined water via reduction of the hydrogen ion and the oxygen molecule. The recombined water enters the cathode side flow channel 124 and is transported from the cathode side flow channel 124 to the anode side flow channel 122 along the recombined water channel 128 for reuse in the continuous closed-loop oxidation/reduction cycle.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A photocatalytic power generation system comprising a solar housing, a photoanode, an electrolyte membrane, a cathode, an oxygen diffusion membrane, and an external power generation circuit, wherein:

the solar housing comprises an input window transparent to photoanode activating radiation;

the solar housing comprises an anode side and a cathode side;

the photoanode is positioned within the solar housing at the anode side and is electrically coupled to the external power generation circuit;

the cathode is positioned within the solar housing at the cathode side and is electrically coupled to the external power generation circuit;

the electrolyte membrane is positioned between and electrochemically engaged with the photoanode and the cathode forming a photocatalytic cell;

the solar housing comprises a closed-loop water chamber having an anode side flow channel positioned at the anode side and a cathode side flow channel positioned at the cathode side;

the solar housing comprises a recombined water channel extending from the anode side flow channel to the cathode side flow channel;

the solar housing comprises an oxygen transport channel extending from the anode side flow channel to the cathode side flow channel; and the oxygen diffusion membrane is positioned between the anode side flow channel and the oxygen transport channel and is structurally configured to inhibit recombined water generated at the cathode from flowing from the cathode side flow channel to the anode side flow channel along the oxygen transport channel and permit recombined water generated at the cathode from flowing from the cathode side flow channel to the anode side flow channel along the recombined water channel.

2. The photocatalytic power generation system of claim 1, wherein water is housed within the closed-loop water chamber of the solar housing and the photocatalytic cell is hermetically sealed within the solar housing.

3. The photocatalytic power generation system of claim 1, wherein the input window is positioned at the anode side of the solar housing and is transparent to photoanode activating radiation.

4. The photocatalytic power generation system of claim 1, further comprising:
a first cell wall coupled to the photocatalytic cell and positioned between the photocatalytic cell and the recombined water channel; and
a second cell wall coupled to the photocatalytic cell and positioned between the photocatalytic cell and the oxygen transport channel, wherein the oxygen diffusion membrane is positioned between and coupled to the second cell wall and the solar housing.

5. The photocatalytic power generation system of claim 1, wherein the photoanode is structurally configured to receive photoanode activating radiation and, upon exposure to photoanode activating radiation, output an electron receivable by the external power generation circuit and generate an electron hole such that water housed within the closed-loop water chamber oxidizes into a hydrogen ion and an oxygen molecule at the electron hole.

6. The photocatalytic power generation system of claim 1, wherein the electrolyte membrane is structurally configured to provide a proton pathway between the photoanode and the cathode.

7. The photocatalytic power generation system of claim 1, wherein the cathode is structurally configured to receive a hydrogen ion from a proton pathway provided by the electrolyte membrane, receive an oxygen molecule, and combine the hydrogen ion and the oxygen molecule into recombined water via reduction of the hydrogen ion and the oxygen molecule.

8. The photocatalytic power generation system of claim 1, wherein the photoanode is doped with a photon upconversion doping material and is structurally configured to (i) receive photoanode activating radiation comprising a first photon having a first photon energy and a second photon having a second photon energy and (ii) combine the first photon energy and the second photon energy.

9. The photocatalytic power generation system of claim 1, wherein the photoanode is doped with a photon downconversion doping material and is structurally configured to (i) receive photoanode activating radiation comprising a first photon and, upon exposure to the first photon, output two electrons receivable by the external power generation circuit and (ii) generate two electron holes such that water housed within the closed-loop water chamber oxidizes into a hydrogen ion and an oxygen molecule at each electron hole.

10. The photocatalytic power generation system of claim 1, further comprising a solar irradiation heat trap positioned within the solar housing, wherein:
the input window is transparent to solar irradiation heat trap activating radiation; and
the solar irradiation heat trap is structurally configured to absorb solar radiation and, upon absorption of solar radiation, increase in temperature, increasing a chemical efficiency of the photocatalytic cell.

11. The photocatalytic power generation system of claim 10, wherein the photoanode is structurally configured to absorb solar radiation within a first wavelength range and the solar irradiation heat trap is structurally configured to absorb solar radiation within a second wavelength range that is at least partially exclusive of the first wavelength range.

12. The photocatalytic power generation system of claim 1, further comprising an infrared heating layer structurally configured to absorb solar radiation comprising an infrared wavelength range of solar radiation and, upon absorption of the infrared wavelength range of solar radiation, increase in temperature, increasing a chemical efficiency of the photocatalytic cell, wherein the input window is transparent to infrared heating layer activating radiation.

13. The photocatalytic power generation system of claim 1, further comprising a solar irradiation heat trap thermally coupled to the cathode, wherein the input window is transparent to solar irradiation heat trap activating radiation.

14. The photocatalytic power generation system of claim 13, wherein the solar irradiation heat trap comprises a plurality of porous strips affixed to the cathode in an intermittent arrangement.

15. The photocatalytic power generation system of claim 1, wherein the external power generation circuit comprises:
a power generation unit structurally configured to receive current generated by electrons output by the photoanode and, upon receiving current, generate power; and
a circuit pathway electrically coupled to the photoanode, the power generation unit and the cathode.

16. The photocatalytic power generation system of claim 1, wherein:
the photoanode comprises a first photoanode and a second photoanode; and
the second photoanode is electrochemically engaged with the first photoanode and is positioned between the first photoanode and the electrolyte membrane.

17. The photocatalytic power generation system of claim 16, wherein:
the first photoanode is structurally configured to absorb solar radiation within a first wavelength range; and
the second photoanode is structurally configured to absorb solar radiation within a second wavelength range that is at least partially exclusive of the first wavelength range.

18. The photocatalytic power generation system of claim 16, wherein the photoanode further comprises a third photoanode electrochemically engaged with the second photoanode and positioned between the second photoanode and the electrolyte membrane.

19. The photocatalytic power generation system of claim 18, wherein:
the first photoanode is structurally configured to absorb solar radiation within a first wavelength range, the second photoanode is structurally configured to absorb solar radiation within a second wavelength range, and the third photoanode is structurally configured to absorb solar radiation within a third wavelength range; and
the first, second, and third wavelength ranges comprise wavelengths that are at least partially exclusive of wavelengths in remaining ones of the first, second, and third wavelength ranges.

20. The photocatalytic power generation system of claim 1, wherein the photocatalytic cell comprises a plurality of photocatalytic sub-cells each comprising a photoanode, an electrolyte membrane, and a cathode.

21. The photocatalytic power generation system of claim 20, wherein:
the plurality of photocatalytic sub-cells comprise a first photocatalytic sub-cell and a second photocatalytic sub-cell;
the second photocatalytic sub-cell is positioned between the first photocatalytic sub-cell and the cathode side flow channel; and
the second photocatalytic sub-cell is spaced apart from the first photocatalytic sub-cell to form a first water sub-chamber therebetween.

22. The photocatalytic power generation system of claim 21, wherein the first photocatalytic sub-cell is transparent to solar radiation within a wavelength range; and
a photoanode of the second photocatalytic sub-cell is structurally configured to absorb solar radiation within the wavelength range.

23. The photocatalytic power generation system of claim 21, wherein the plurality of photocatalytic sub-cells comprise a third photocatalytic sub-cell positioned between the second photocatalytic sub-cell and the cathode side flow channel and spaced apart from the second photocatalytic sub-cell to form a second water sub-chamber therebetween.

24. The photocatalytic power generation system of claim 23, wherein:
the first photocatalytic sub-cell is transparent to solar radiation within both a first wavelength range and solar radiation within a second wavelength range that is at least partially exclusive of the first wavelength range;
the second photocatalytic sub-cell is transparent to solar radiation within the second wavelength range;
a photoanode of the second photocatalytic sub-cell is structurally configured to absorb solar radiation within the first wavelength range; and
a photoanode of the third photocatalytic sub-cell is structurally configured to absorb solar radiation within the second wavelength range.

25. A photocatalytic power generation system comprising a solar housing, a photoanode, an electrolyte membrane, a cathode, an oxygen diffusion membrane, and an external power generation circuit, wherein:
the solar housing comprises an input window transparent to photoanode activating radiation;
the photoanode is positioned within the solar housing and is electrically coupled to the external power generation circuit;
the cathode is positioned within the solar housing and is electrically coupled to the external power generation circuit;
the solar housing comprises a closed-loop water chamber that encircles the photoanode, the cathode, and the electrolyte membrane;
the oxygen diffusion membrane is positioned in the closed-loop water chamber and is structurally configured to inhibit water flow through the oxygen diffusion membrane and permit oxygen molecule flow through the oxygen diffusion membrane;
the photoanode is structurally configured to receive photoanode activating radiation and, upon exposure to photoanode activating radiation, output an electron receivable by the external power generation circuit and generate an electron hole such that water housed within the closed-loop water chamber oxidizes into a hydrogen ion and an oxygen molecule at the electron hole;
the electrolyte membrane is structurally configured to provide a proton pathway between the photoanode and the cathode;
the closed-loop water chamber is structurally configured to provide a pathway for oxygen molecules that traverses the oxygen diffusion membrane and extends between the photoanode and the cathode;
the cathode is structurally configured to receive the hydrogen ion from the proton pathway, receive the oxygen molecule, and combine the hydrogen ion and the oxygen molecule into recombined water via reduction of the hydrogen ion and the oxygen molecule; and
the closed-loop water chamber is structurally configured to provide a pathway for recombined water that does not traverse the oxygen diffusion membrane and extends between the cathode and the photoanode.

* * * * *